United States Patent [19]

Wakabayashi et al.

[11] E Patent Number: Re. 32,876

[45] Reissued Date of Patent: Feb. 21, 1989

[54] DISC CASSETTE (DISC CARTRIDGE)

[75] Inventors: Manabu Wakabayashi; Kihachiro Minami, both of Yokohama; Tohru Sanpei, Kanagawa; Kazutoshi Konno, Yokosuka, all of Japan

[73] Assignee: Hitachi, Ltd., Tokyo, Japan

[21] Appl. No.: 114,222

[22] Filed: Oct. 29, 1987

Related U.S. Patent Documents

Reissue of:

[64] Patent No.: 4,550,354
Issued: Oct. 29, 1985
Appl. No.: 434,744
Filed: Oct. 18, 1982

[30] Foreign Application Priority Data

Oct. 21, 1981 [JP] Japan ..... 56-167172

[51] Int. Cl.[4] ..... G11B 23/02
[52] U.S. Cl. ..... 360/133
[58] Field of Search ..... 360/133, 132, 60, 97–99

[56] References Cited

U.S. PATENT DOCUMENTS

| | | | |
|---|---|---|---|
| 3,416,150 | 12/1908 | Lindberg, Jr. | 206/444 |
| 3,529,301 | 9/1970 | Hiruta | 360/133 |
| 4,120,012 | 10/1978 | Bowers | 360/133 |
| 4,185,314 | 1/1980 | Hatchett et al. | 360/133 |
| 4,399,480 | 8/1983 | Edwards | 360/132 |
| 4,459,628 | 7/1984 | Barton | 360/133 |

FOREIGN PATENT DOCUMENTS 8202480 1/1983 Netherlands .

*Primary Examiner*—John H. Wolff
*Attorney, Agent, or Firm*—Antonelli, Terry & Wands

[57] ABSTRACT

A disc cassette (11) for containing a disc (18) for rotation equipped with a shutter (**14a, 14*b*) for opening and closing head windows (13) in slot form. The shutter automatically opens when the disc cassette is mounted on a cassette drive apparatus and automatically closes when it is removed therefrom. The shutter is mounted in center openings (15a, 15b) of the disc cassette for rotation therearound and has locked to one end portion thereof a movable belt (22) which causes the shutter to rotate when it moves. The movable belt has fastened thereto a spring (29, 50**) for moving the belt in sliding movement to close the shutter at all times when the disc cassette is removed from the cassette drive apparatus.

10 Claims, 5 Drawing Sheets

DISC CASSETTE (DISC CARTRIDGE)

Matter enclosed in heavy brackets [ ] appears in the original patent but forms no part of this reissue specification; matter printed in italics indicates the additions made by reissue.

FIELD OF THE INVENTION

This invention relates to a disc cassette (disc cartridge) containing a flexible magnetic disc or other information recording disc, and more particularly it deals with a shutter opening and closing system for use with this type of disc cassette (disc cartridge).

DESCRIPTION OF THE PRIOR ART

A flexible magnetic disc of the prior art has usually been contained in a case formed with an opening, such as a head window, or a center opening. Dust or foreign matter has tended to enter the case through the opening and be readily deposited on the magnetic disc. When the cassette is held at the opening by the fingers, the finger prints have tended to be formed on the surface of the magnetic disc. Deposition of dust or finger prints on the surface of the magnetic disc tends to cause a drop-out to occur in signals reproduced from the magnetic disc. Thus it has hitherto been necessary to handle the case with meticulous care.

To obviate this disadvantage of the prior art, proposals have been made to provide the case of a disc cassette with a shutter to keep dust and foreign matter from entering the case. FIG. 1 schematically shows a disc cassette of the prior art provided with a shutter. The disc cassette 1 includes a case 3 containing a flexible magnetic disc 2. The case 3 has arranged on its surface a shutter 4 adapted to move in sliding movement along guides 7. A spring 6 is mounted between the case 3 and the shutter 4 to normally keep the shutter 4 in a closed position by the biasing force of the spring 6. When the disc cassette 1 is mounted on a magnetic recording and reproducing apparatus 8 in the direction of an arrow A in FIG. 2, a projection 5 affixed to the shutter 4 abuts against a lever 9 attached to the apparatus 8, so that the spring 6 is expanded to bring the shutter 4 to an open position. Thus the flexible magnetic disc 2 is exposed to view through a head window 10 formed in the case 3.

When it is desired to remove the disc cassette 1 from the apparatus 8, the disc cassette 1 is moved in the direction of an arrow B in FIG. 2 to contract the spring 6, so that the shutter is gradually brought to a closed position.

Some disadvantages are associated with this type of cassette disc provided with a shutter. In this type of disc cassette, the shutter 4 should move along the two guides 7 and the spring 6 is only located on one side of the shutter 4. This tends to tilt the shutter 4. Tilting of the shutter 4 increases the frictional dragging of the shutter 4 on the guides 7 and 7, thereby preventing the shutter 4 from being completely closed. If a spring of high resilience is used, it would be possible to close the shutter 4 against the frictional dragging thereof on the guides 7. However, a force of high magnitude would be required for opening the shutter 4 against the biasing force of such spring.

SUMMARY OF THE INVENTION

This invention has as its object the provision of a disc cassette (disc cartridge) provided with a system for opening and closing a shutter for a head window of a case operative to open the shutter only when the disc cassette is mounted on a magnetic recording and reproducing apparatus and to automatically close the shutter smoothly as the disc cassette is removed from the apparatus.

With only one guide, frictional dragging is little if the shutter is correctly positioned with respect to the shutter guide at all times, so that the shutter smoothly moves along the guide at all times with little frictional dragging on the guide. If this principle were worked out, it would be possible to close the shutter against the frictional dragging by using a spring of low resilience.

The outstanding characteristic of the invention is that the magnetic disc uses a circular guide and the shutter moves in rotary movement along the single guide while being positively held by the guide. The shutter has secured thereto a spring in a position remote from the guide, to enable the shutter to be opened with a force of low magnitude and closed smoothly.

DETAILED DESCRIPTION OF THE PREFERRED EMBODIMENTS

Figure 1:
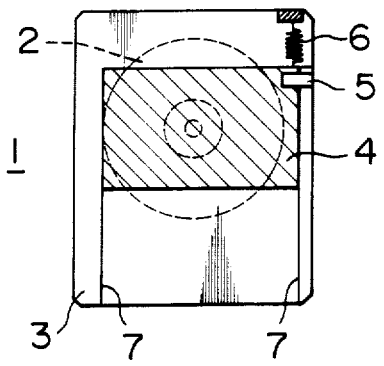
FIG. 1 PRIOR ART
FIG. 1 is a front view of a disc cassette of the prior art.
Figure 2:
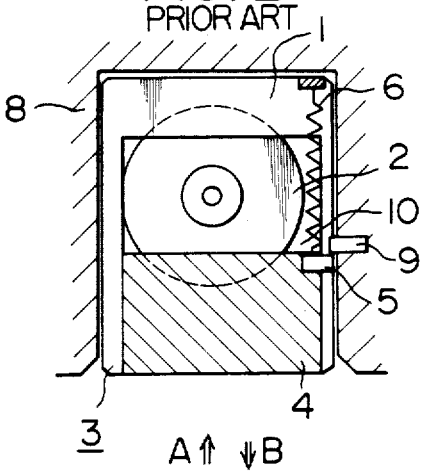
FIG. 2 PRIOR ART
FIG. 2 is a sectional view of the disc cassette shown in FIG. 1, showing the disc cassette being mounted in a cassette drive apparatus.
Figure 3:
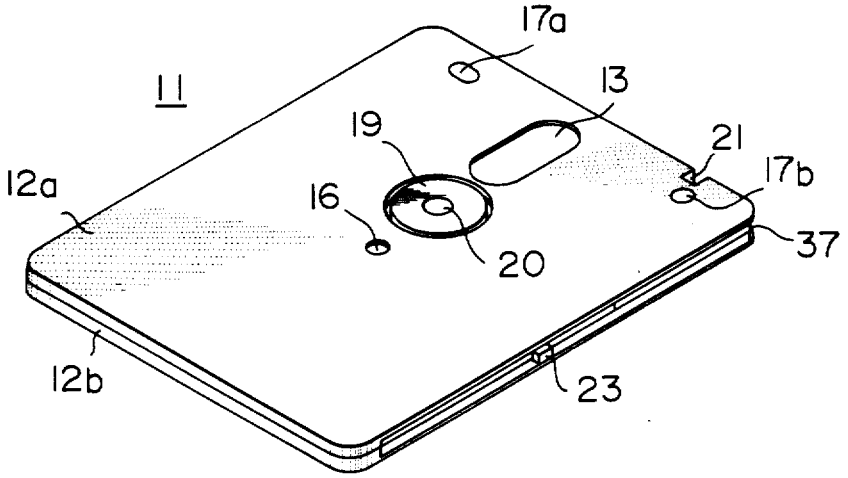
FIG. 3 is a perspective view of the disc cassette comprising one embodiment of the invention.
Figure 4A:
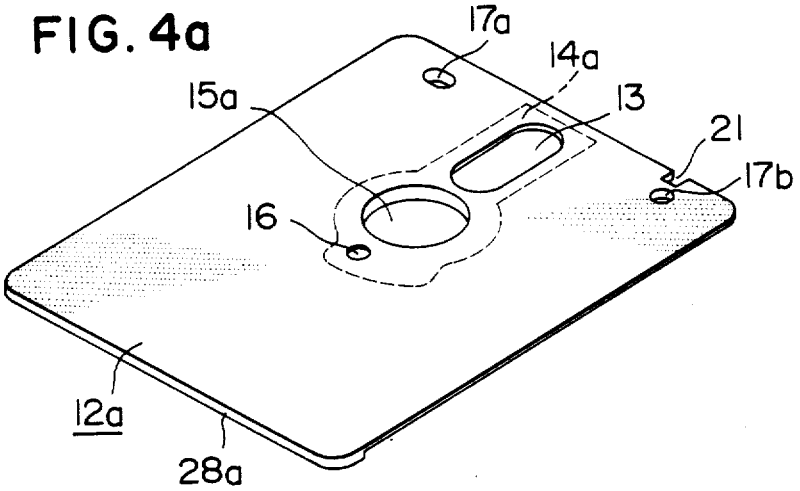
FIGS. 4a, 4b and 4c are exploded perspective views of the disc cassette according to the invention.
Figure 4B:
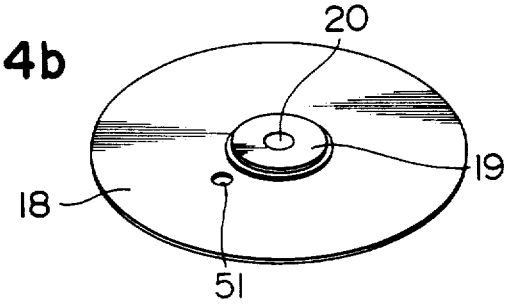
Figure 4C:
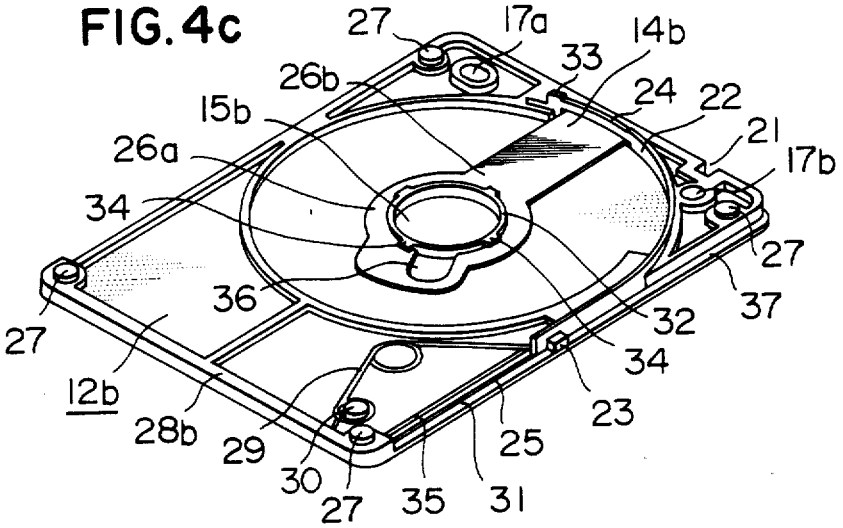
Figure 5:
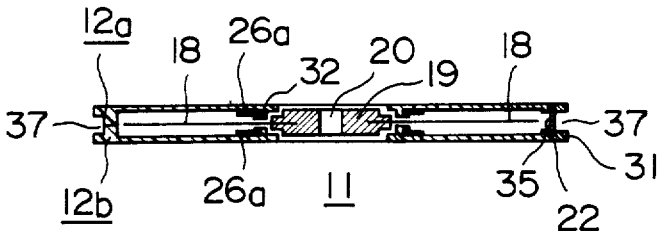
FIG. 5 is a sectional view of the disc cassette according to the invention.

The disc cassette according to the invention is shown in a perspective view in FIG. 3, in exploded perspective views in FIGS. 4a, 4b and 4c and in a sectional view in FIG. 5. The disc cassette 11 comprising one embodiment comprises a half case 12a and a half case 12b rigidly formed of a synthetic resinous material and connected together in face-to-face relation to constitute a housing for containing a disc 18 therein. The half case 12a is formed with a head window 13, an opening 15a, an indexing window 16, positioning apertures 17a and 17b and a cutout 21 and has a shutter 14a mounted thereon. The disc 18 has formed in the central portion thereof a hub 19 formed with a hole 20. An indexing hole 51 is arranged on the disc 18. Like the half case 12a, the half case 12b is formed with an opening 15b, positioning apertures 17a and 17b and a cutout 21. Although not shown in FIG. 4c, the half case 12b is formed, as is the case with the half case 12a, with a head window 13 and an indexing window 16. The half case 12b has a shutter 14b mounted thereon, the shutter 14b being composed of an annular portion 26a and a plate-like portion 26b, the annular portion 26a being fitted on a cylindrical guide 32 located around the opening 15b and the plate-like portion 26b being located in a position in which it is able to cover the head window 13. The annular portion 26a is fastened to the cylindrical guide 32 at a projection 34 formed at the cylindrical guide 32, the projection 34 being provided by heating and deforming a portion of the cylindrical guide 32. The shutter 14b is capable of rotating with respect to the cylindrical guide 32. Rotation of the shutter 14b causes the plate-like portion 26b to move, thereby exposing the head window 13 to view. The annular portion 26a is formed with a cutout 36 in one portion thereof. The indexing window 16 is covered with a portion of the annular portion 26a when the platelike portion 26b of the shutter 14b is in the position in which it covers the head window 13. However, when the plate-like portion 26b has moved to a position in which it allows the head window 13 to be exposed to view, the cutout 36 is brought into index with the indexing window 16. The half cases 12a and 12b are formed with ribs 28a and 28b respectively which are brought into contact with each other when the half cases 12a and 12b are connected to each other.

Figure 6:
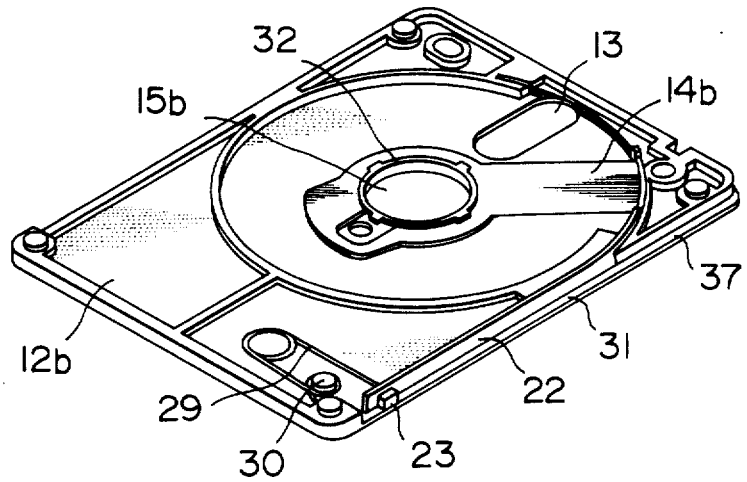
FIG. 6 is an exploded perspective view of the disc cassette according to the invention.

A vertical projection 27 is formed at each of four corners of the half case 12b which is adapted to be received in a recess, not shown, formed at each of four corners of the half case 12a. After being received in the recesses, the projections 27 are bonded to the half case 12a as by supersonic melt adhesion to connect the half cases 12a and 12b together. The half cases 12a and 12b are each formed with ribs 31 at opposite sides to provide the disc cassette 11 with guide channels 37. A rod-like guide 35 is formed in parallel with one of the ribs 31 to define there between a groove 25 which is extended in arcuate form to reach a point on a side above the head window 13. Arranged in the groove 25 is a resilient movable belt 22 of plate form which moves in sliding movement therein. The half case 12a is also formed with a groove 25 in a position corresponding to that of the groove 25 of the half case 12b. The belt 22 is formed with a projection 23 at one end which is located in one of the guide channels 37, and a cutout 24 and a projection 33 at the other end. The cutout 24 has a plate-like portion 26b of the shutter 14b fitted therein. As the movable belt 22 moves in sliding movement in the grooves 25, the shutters 14a and 14b rotate. The movable belt 22 has fastened thereto one end of a torsion spring 29 secured at the other end to a projection 30 on the half case 12b. The torsion spring 29 is normally expanded to cause the belt 22 to move in sliding movement to make the shutters 14a and 14b to close the head windows 13. As a force is exerted on the projection 23, the torsion spring 29 is contracted as shown in FIG. 6, to thereby rotate the shutters 14a and 14b to open the head windows 13.

Figure 7:
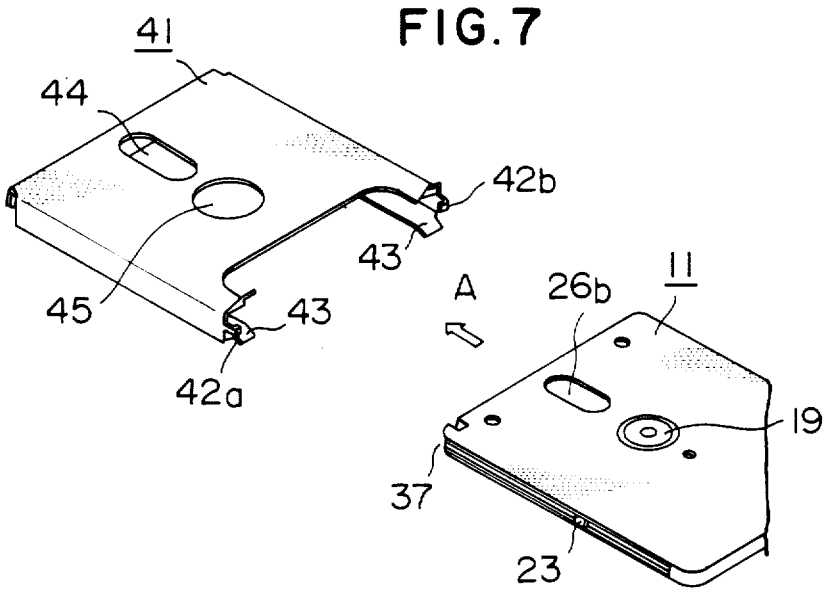
FIG. 7 is a perspective view of a cassette drive apparatus and a disc cassette.

FIG. 7 shows the essential portions of the disc cassette 11 and a cassette drive apparatus on which the disc cassette 11 is mounted. Cassette receiving means 41 of the apparatus including a case-like member formed with tongues 42a and 42b, guides 43 and 43, a window 44, and a hole 45. The disc cassette 11 is moved in the direction of an arrow A along the guides 43 an 43 to be inserted in the cassette receiving means 41. The tongues 42a and 42b are each in the form of a letter L and move in sliding movement along one of the channels 37 of the disc cassette 11. The tongue 42a abuts against the projection 23 of the disc cassette 11 to cause the latter to move in sliding movement. That is, a force is exerted by the tongue 42a on the projection 23. As a result, the torsion spring 29 is contracted and the shutters 14a and 14b are opened. Upon the disc cassette 11 being withdrawn from the cassette receiving means 41, the force exerted on the projection 23 by the tongue 42a is released, to expand the torsion spring 29 and open the shutters 14a and 14b. While the disc cassette 11 is being inserted in the cassette receiving means 41, the hub 19 is rotated by a shaft, not shown, extending through the hole 45, so that signals recorded in the disc 18 are reproduced through the window 44.

Figure 8:
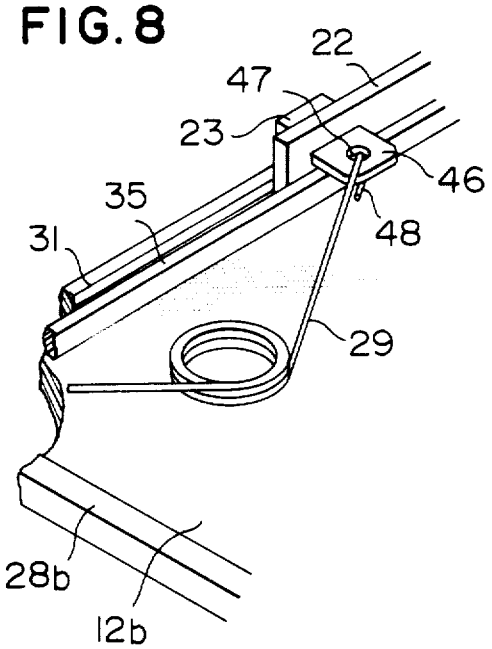
FIG. 8 is a perspective view of the essential portions of the disc cassette according to the invention.

FIG. 8 shows means for fastening the torsion spring 29 to the movable belt 22. As shown, the spring 29 has its forward end portion 48 bent in the form of a letter U which is received in an opening 47 formed in a projection 46 of the movable belt 22 in locking relation.

Figure 9:
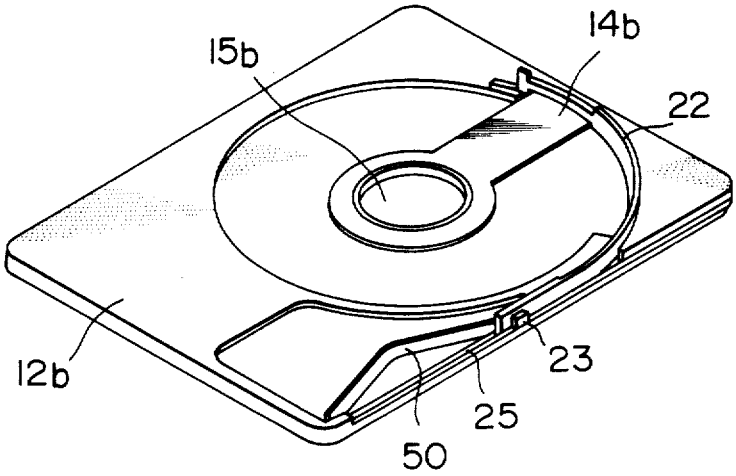
FIG. 9 is a perspective view of the essential portions of another embodiment of the disc cassette in conformity with the invention.

FIG. 9 shows another embodiment of the disc cassette in conformity with the invention. In this embodiment, the torsion spring 29 is replaced by a plate spring 50 which is expanded and contracted to open and close the shutter 14b.

In the invention, the shutters 14a and 14b of the disc cassette 11 rotate about one cylindrical guide 32, so that the shutters 14a and 14b can move smoothly. The movable belt 22 secured at one end to the torsion spring 29 is locked at the other end to a forward end of the plate-like portion 26b of the shutters 14a and 14b, so that the spring 29 is located remote from the cylindrical guide 32. This enables the shutters 14a and 14b to be positively closed even if the frictional dragging of the annular portion 26a of the shutters 14a and 14b on the cylindrical guide 32 is great and the spring 29 is low in resilience. Also, in the disc cassette 11 according to the invention, the movable belt 22 and the projection 23 scarcely extend outwardly of the cassette 11, thereby preventing the shutters 14a and 14b being inadvertently opened.

From the foregoing description, it will be appreciated that in the disc cassette according to the invention, the shutter can be positively opened and closed. The shutter can be automatically opened as the disc cassette is mounted on a cassette drive apparatus and automatically closed as the former is removed from the latter. The chances of the shutter being inadvertently opened are very slim, and the disc cassette has the shutter closed at all times when it is not mounted in the cassette drive apparatus. This is conductive to prevention of dust or foreign matter from entering the cassette and of the fingers mistakenly touching the surface of the disc.

What is claimed is:

1. A disc cassette (disc cartridge) formed, at each of opposite surfaces with a center opening for driving an information recording disc and a slot extending radially of the information recording disc to allow information recorded in the disc to be retrieved and including a housing of a substantially square shape for containing the information recording disc in enclosing relation, such disc cassette comprising:

(a) a pair of shutter means interposed between said disc for recording information and said housing and each of said shutter means including an annular portion located at one end portion and formed with a hole larger in size than the center openings, and a plate-like portion located at the other end portion and having an area greater than the area of the slots, said annular portion capable of rotating around said center openings to allow said shutter means to move between two stop positions, said plate-like portions being brought into index with said slot in the first stop position to close the same and brought out of index therewith in the second stop position to open the same;

(b) holding means formed on the disc cassette for holding the annular portion of the shutter means for rotation around the center openings;

(c) moving means coupled to the platelike portion of the shutter means for exerting a force on the plate-like portion to cause the annular portion of the shutter means to rotate around the center openings; and (d) resilient means comprising a torsion spring coupled at one end to the moving means and at the other end to the disc cassette for exerting a biasing force on the moving means to cause the shutter means to move from the second stop position to the first stop position, and wherein a coiled portion of the torsion spring moves laterally relative to the disc cartridge when the shutter means moves between the first stop position and the second stop position.

2. A disc cassette as claimed in claim 1, wherein said moving means comprises a belt having resilience.

3. A disc cassette as claimed in claim 1, wherein said disc cassette is formed with a groove for receiving the moving means, said groove comprising an arcuate portion formed in a position near the slot and a straight portion continuous with the arcuate portion formed at one side of the disc cassette, and wherein said cassette disc is formed at opposite sides with guide channels and the moving means comprises a belt having resilience and formed at one end portion with a projection located in one of said guide channels, whereby the belt is moved as a force is exerted on said projection.

4. A disc cassette as claimed in claim 1, wherein said disc cassette is formed with a groove for receiving said moving means to allow the same to move in sliding movement therein.

5. A disc cassette as claimed in claim 4, wherein said groove comprises an arcuate portion formed in a position near the slot and a straight portion contiguous with the arcuate portion formed at one side of the disc cassette.

6. A disc cassette as claimed in claim 2, wherein said belt is formed at one end portion with a projection for exerting a force on the belt.

*7. A disc cartridge including an information recording disc, said disc cartridge comprising:*

*(a) a housing within which said information recording disc is rotatably arranged, said housing having an opening for driving said information recording disc, and a head window through which information recorded on said information recording disc is read out;*

*(b) a shutter member mounted to said housing for movement relative thereto, said shutter member having a plate-like portion formed to have an area larger than that of said head window in said housing, said plate-like portion being movable between a first stop position where said plate-like portion covers said head window in said housing and a second stop position where said plate-like portion uncovers said head window in said housing; and*

*(c) resilient means comprising a torsion spring having a coiled portion and first and second end portions, said first end portion being associated with said housing and said second end portion being associated with said shutter member, said resilient means applying a biasing force to said shutter member to move the same from said second stop position toward said first stop position,*

*wherein said coiled portion of said torsion spring moves laterally relative to said housing and said second end portion of said torsion spring moves linearly when said plate-like portion of said shutter member moves between said first and second stop positions.*

*8. A disc cartridge including an information recording disc, said disc cartridge comprising:*

*(a) a housing within which said information recording disc is rotatably arranged, said housing having a pair of openings for driving said information recording disc, and a pair of head windows through which information recorded on said information recording disc is read out;*

*(b) a shutter member mounted to said housing for movement relative thereto, said shutter member having a pair of plate-like portions each formed to have an area larger than that of a corresponding one of said head windows in said housing, said plate-like portions being movable between a first stop position where said plate-like portions respectively cover said head windows in said housing and a second stop position where said plate-like portions respectively uncover said head windows in said housing; and*

*(c) resilient means comprising a torsion spring having a coiled portion and first and second end portions, said first end portion being associated with said housing and said second end portion being associated with said shutter member, said resilient means applying a biasing force to said shutter member to move the same from said second stop position toward said first stop position,*

*wherein said coiled portion of said torsion spring moves laterally relative to said housing and said second end portion of said torsion spring moves linearly when said plate-like portions of said shutter member move between said first and second stop positions.*

*9. A disc cartridge including an information recording disc, said disc cartridge comprising:*

*(a) a housing within which said information recording disc is rotatably arranged, said housing having an opening for driving said information recording disc, and a head window through which information recorded on said information recording disc is read out;*

*(b) a shutter member mounted to said housing for movement relative thereto, said shutter member having a plate-like portion formed to have an area larger than that of said head window in said housing, said plate-like portion being movable between a first stop position where said plate-like portion covers said head window in said housing and a second stop position where said plate-like portion uncovers said head window in said housing; and*

*(c) resilient means comprising a plate spring having a bent portion and first and second end portions, said first end portion being associated with said housing and said second end portion being associated with said shutter member, said resilient means applying a biasing force to said shutter member to move the same from said second stop position toward said first stop position,*

*wherein said bent portion of said plate spring moves laterally relative to said housing and said second end portion of said plate spring moves linearly when*

*said plate-like portion of said shutter member moves between said first and second stop positions.*

*10. A disc cartridge including an information recording disc, said disc cartridge comprising:*

*(a) a housing within which said information recording disc is rotatably arranged, said housing having a pair of openings for driving said information recording disc, and a pair of head windows through which information recorded on said information recording disc is read out;*

*(b) a shutter member mounted to said housing for movement relative thereto, said shutter member having a pair of plate-like portions each formed to have an area larger than that of a corresponding one of said head windows in said housing, said plate-like portions being movable between a first stop position where said plate-like portions respectively cover said head windows in said housing a second stop position where said plate-like portions respectively uncover said head windows in said housing; and*

*(c) resilient means comprising a plate spring having a bent portion and first and second end portions, said first end portion being associated with said housing and said second end portion being associated with said shutter member, said resilient means applying a biasing force to said shutter member to move the same from said second stop position toward said first stop position,*

*wherein said bent portion of said plate spring moves laterally relative to said housing and said second end portion of said plate spring moves linearly when said plate-like portions of said shutter member move between said first and second stop positions.*

* * * * *

US001032876B1

REEXAMINATION CERTIFICATE (3686th)

United States Patent [19]

[11] B1 Re. 32,876

Wakabayashi et al.

[45] Certificate Issued Dec. 15, 1998

[54] DISC CASSETTE (DISC CARTRIDGE)

[75] Inventors: Manabu Wakabayashi; Kihachiro Minami, both of Yokohama; Tohru Sanpei, Kanagawa; Kazutoshi Konno, Yokosuka, all of Japan

[73] Assignee: Hitachi Ltd., Tokyo, Japan

Reexamination Request:
No. 90/004,708, Aug. 12, 1997

Reexamination Certificate for:

| | |
|---|---|
| Patent No.: | **1,032,876** |
| Issued: | **Feb. 21, 1989** |
| Appl. No.: | **114,222** |
| Filed: | **Oct. 29, 1987** |

Related U.S. Patent Documents

Reissue of:

| | |
|---|---|
| [64] Patent No.: | **4,550,354** |
| Issued: | **Oct. 29, 1985** |
| Appl. No.: | **434,744** |
| Filed: | **Oct. 18, 1982** |

[30] Foreign Application Priority Data

Oct. 21, 1981 [JP] Japan ..... 56-167172

[51] Int. Cl.[6] ..... G11B 23/02

[52] U.S. Cl. ..... 360/133

[58] Field of Search ..... 360/133

[56] References Cited

U.S. PATENT DOCUMENTS

| | | | |
|---|---|---|---|
| 3,746,346 | 7/1973 | Mayer et al. | 274/9 R |
| 4,400,748 | 8/1983 | Bauck et al. | 360/133 X |

FOREIGN PATENT DOCUMENTS

| | | |
|---|---|---|
| 45-346 | 1/1970 | Japan . |
| 45-353 | 1/1970 | Japan . |
| 48-44142 | 7/1973 | Japan . |
| 48-77551 | 9/1973 | Japan . |
| 51-27112 | 2/1976 | Japan . |
| 54-8916 | 1/1979 | Japan . |
| 55-16058 | 4/1980 | Japan . |
| 55-146651 | 11/1980 | Japan . |

*Primary Examiner*—John H. Wolff

[57] ABSTRACT

A disc cassette (11) for containing a disc (18) for rotation equipped with a shutter (14a, 14b) for opening and closing head windows (13) in slot form. The shutter automatically opens when the disc cassette is mounted on a cassette drive apparatus and automatically closes when it is removed therefrom. The shutter is mounted in center openings (15a, 15b) of the disc cassette for rotation therearound and has locked to one end portion thereof a movable belt (22) which causes the shutter to rotate when it moves. The movable belt has fastened thereto a spring (29, 50) for moving the belt in sliding movement to close the shutter at all times when the disc cassette is removed from the cassette drive apparatus.

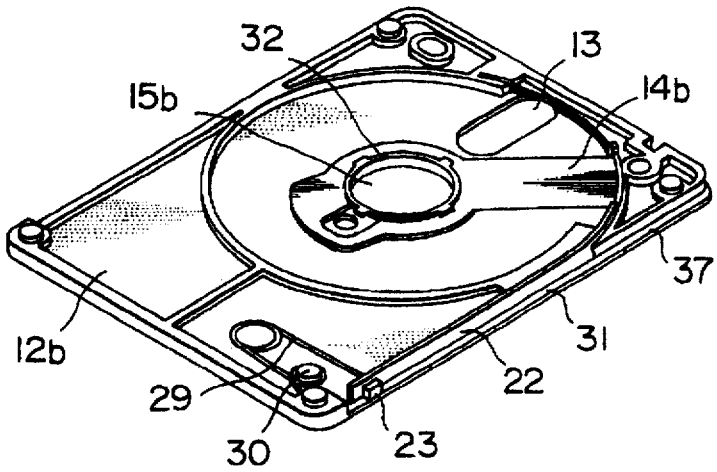

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *